United States Patent
Takahashi et al.

(10) Patent No.: US 7,442,265 B2
(45) Date of Patent: Oct. 28, 2008

(54) HEAT-RESISTANT CAST STEEL EXCELLENT IN AGED DUCTILITY AND CREEP RUPTURE STRENGTH FOR HYDROGEN PRODUCING REACTION TUBES

(75) Inventors: Makoto Takahashi, Hirakata (JP); Kunihide Hashimoto, Katano (JP)

(73) Assignee: Kubota Corporation, Osaka-Shi (JP)

( * ) Notice: Subject to any disclaimer, the term of this patent is extended or adjusted under 35 U.S.C. 154(b) by 253 days.

(21) Appl. No.: 10/574,650

(22) PCT Filed: Oct. 18, 2004

(86) PCT No.: PCT/JP2004/015354

§ 371 (c)(1),
(2), (4) Date: Apr. 4, 2006

(87) PCT Pub. No.: WO2005/038066

PCT Pub. Date: Apr. 28, 2005

(65) Prior Publication Data

US 2007/0034302 A1 Feb. 15, 2007

(30) Foreign Application Priority Data

Oct. 20, 2003 (JP) .............................. 2003-359203

(51) Int. Cl.
*C22C 38/50* (2006.01)
(52) U.S. Cl. ......................... 148/327; 420/40; 420/54; 420/55
(58) Field of Classification Search .................. 148/327; 420/40

See application file for complete search history.

(56) References Cited

U.S. PATENT DOCUMENTS

| | | | |
|---|---|---|---|
| 3,658,516 A * | 4/1972 | Hachisu et al. | 420/40 |
| 5,489,416 A * | 2/1996 | Takahashi et al. | 420/40 |
| 6,764,555 B2 * | 7/2004 | Hiramatsu et al. | 148/325 |
| 7,258,752 B2 * | 8/2007 | Maziasz et al. | 148/327 |
| 2003/0231976 A1 * | 12/2003 | Iseda | 420/54 |

FOREIGN PATENT DOCUMENTS

| | | |
|---|---|---|
| JP | 11-279714 | 10/1999 |
| JP | 2003-268503 | 9/2003 |
| JP | 2003-286005 | 10/2003 |

* cited by examiner

*Primary Examiner*—George Wyszomierski
(74) *Attorney, Agent, or Firm*—Kratz, Quintos & Hanson, LLP

(57) ABSTRACT

A heat-resistant cast steel excellent in high-temperature strength, aged ductility and creep rupture strength for use as a material for steam reforming reaction tubes in fuel cell hydrogen generation systems and the like. The cast steel has a chemical composition comprising, in mass %, 0.1 to 0.5% of C, up to 2.5% of Si, up to 2.5% of Mn, 15 to 26% of Cr, 8 to 23% of Ni, 0.1 to 1.2% of Nb, 0.01 to 1.0% of Ti, 0.001 to 0.15% of Ce, up to 0.06% of N and the balance substantially Fe, the cast steel being 20 to 45 in the parameter value P calculated from the expression:

$$P=89.3-78.4C+0.1Si-5.7Mn-1.7Cr+0.01Ni+2Nb+5.3Ti-36.5N-50.8Ce.$$

When desired, the steel contains at least one of 0.001 to 0.05% of B, 0.01 to 0.5% of Zr and 0.001 to 0.15% of La, and/or 0.01 to 0.3% of Al. Further when desired, the C, Cr and Ni contents are limited to 0.1 to 0.3% of C, 15 to 20% of Cr and 8 to 18% of Ni.

16 Claims, No Drawings

HEAT-RESISTANT CAST STEEL EXCELLENT IN AGED DUCTILITY AND CREEP RUPTURE STRENGTH FOR HYDROGEN PRODUCING REACTION TUBES

TECHNICAL FIELD

The present invention relates to heat-resistant cast steel which is excellent in aged ductility and creep rupture strength for use as a material for making hydrogen producing reaction tubes for the generation of hydrogen or a synthesis gas consisting mainly of hydrogen from hydrocarbons such as petroleum fuels, natural gas or the like by steam reforming.

BACKGROUND ART

With steam reformer furnaces for generating hydrogen in oil refineries, a gas mixture of a petroleum fuel (naphtha, crude gasoline or the like) and steam is fed to a reaction tube and subjected to a reforming reaction $[C_mH_n+mH_2O \rightarrow (n/2+m)H_2+mCO]$ at a high temperature and high pressure (temperature: about 700-900° C., pressure: about 1 to 3 MPa) in the presence of a catalyst to produce a synthesis gas consisting mainly of hydrogen. The reforming reaction tube needs to have a high-temperature strength and high-temperature creep strength so as to withstand a continuous long-term operation under the conditions of high temperature and high pressure. Heat-resistant high-carbon, high-Cr—Ni cast steel, which is a precipitation hardening alloy, has conventionally been used as a material for making the reaction tube. Stated more specifically, the materials heretofore developed up to date are SCH22(0.4C-25Cr-20Ni—Fe) as the first-generation material, IN519(0.3C-24Cr-24Ni-1.5Nb—Fe) as the subsequent second-generation material, and micro alloying materials, such as HP-Nb, Ti alloy (0.5C-25Cr-35Ni—Nb, Ti—Fe) containing a very small amount of Nb, Ti or the like, as the third-generation materials.

Patent Literature 1: publication of JP-B No. 55-47105
Patent Literature 2: publication of JP-B No. 57-40900
Patent Literature 3: publication of JP-A No. 5-239599

In recent years, there is a growing demand for clean energy as a measure against environmental pollution, and fuel cells for use with hydrogen fuel have attracted attention and are thought promising, for example, for use as power sources for motor vehicles. Fuel cells are developed also as distributed power sources on a small scale and partly introduced into actual use. Along with this trend, great efforts are made for developing hydrogen generation systems for supplying hydrogen to fuel cells. These systems include small hydrogen generators and on-site hydrogen generation units (such as so-called "hydrogen stations") for producing hydrogen from liquefied petroleum gas (LPG), town gas (LNG) and hydrocarbons including alcohols, kerosene and light oil.

The steam reforming reaction of hydrogen generation systems for fuel cells is conducted at temperature and pressure (temperature: about 750-800° C., pressure: up to about 1 MPa) relatively lower than the operating conditions for large-sized apparatus in oil refineries, whereas the fuel cell power demand greatly fluctuates between the daytime and the nighttime, with the result that the operation of hydrogen generation systems involves repeated fluctuations in the load on the reforming reaction tube in corresponding relation with the power demand. If such load fluctuations are repeated daily, creep and fatigue accumulate on the reaction tube, leading to fatigue failure. In addition to high-temperature strength and high-temperature creep rupture strength, outstanding fatigue characteristics are therefore required of the reforming reaction tube for use in fuel cell hydrogen generation systems. Although the heat-resistant high-carbon, high-Cr—Ni cast steel of the precipitation hardening type for use in the large-sized apparatus of oil refineries has high-temperature characteristics (high-temperature strength and creep rupture strength) required for a continuous operation at a high temperature and high pressure, the steel still remains to be improved in aged ductility and resistance to fatigue failure required of hydrogen generation systems of the load fluctuation type and is not usable with good stability over a prolonged period of time. When used in an environment having a temperature range of about 800° C. for a long period, the steel also encounters the problem of embitterment resulting from the precipitation of sigma phase and pointed out in the case of the material HK40.

DISCLOSURE OF THE INVENTION

Problem to be Solved by the Invention

An object of the present invention is to solve the foregoing problems experienced with the material for reforming reaction tubes for the generation of hydrogen and to provide a heat-resistant cast steel which has heat resistance and high-temperature creep rupture strength required of steam reforming reaction tubes for use in high-temperature high-pressure environments and which is improved in aged ductility and fatigue characteristics and economically advantageous so as to give enhanced durability and stability to the reaction tube to be subjected to repeated load fluctuations as in fuel cell hydrogen generation systems.

Means for Solving the Problem

The present invention provides a heat-resistant cast steel for hydrogen producing reaction tubes which is characterized in that the cast steel comprises, in mass %, 0.1 to 0.5% of C, up to 2.5% of Si, up to 2.5% of Mn, 15 to 26% of Cr, 8 to 23% of Ni, 0.1 to 1.2% of Nb, 0.01 to 1.0% of Ti, 0.001 to 0.15% of Ce, up to 0.06% of N and the balance substantially Fe, the cast steel being 20 to 45 in the parameter value P represented by Expression [1] given below:

$$P=89.3-78.4C+0.1Si-5.7Mn-1.7Cr+0.01Ni+2Nb+5.3Ti-36.5N-50.8Ce \quad [1]$$

wherein the value attached to the symbol of each element represents the content (%) of the element.

The heat-resistant cast steel of the invention is given a composition containing elements in one of the following combinations (1) to (3) when so desired.

(1) one or at least two elements selected from among 0.001 to 0.05% of B, 0.01 to 0.5% of Zr and 0.001 to 0.15% of La, (2) 0.01 to 0.3% of Al, and (3) 0.001 to 0.3% of Al and one or at least two elements selected from among 0.001 to 0.05% of B, 0.01 to 0.5% of Zr and 0.001 to 0.15% of La.

The heat-resistant cast steel of the invention is further given a composition wherein C is limited to 0.1 to 0.3%, and Cr and Ni are adjusted to the respective ranges of 15 to 20% of Cr and 8 to 18% of Ni.

Advantages of the Invention

The heat-resistant cast steel of the chemical composition described above according to the invention has a metal structure comprising a matrix of austenitic phase and precipitation hardening particles of chromium carbide ($Cr_{23}C_6$) and the like dispersed and precipitated in the matrix. This structure gives the steel the heat resistance and high-temperature creep rupture strength required for use in the high-temperature high-pressure environment of the steam reformer reaction in hydrogen generation systems, inhibits the precipitation of secondary carbides during a prolonged period of high-temperature aging, and obviates the problem of sigma phase embitterment encountered with the conventional material of HK40, permitting the steel to retain high elongation during a prolonged service period as the result of these advantages. While improved fatigue characteristics are required of reformer reaction tubes which are repeatedly subjected to thermal fatigue cycles due to load fluctuations as involved in the operation of fuel cell hydrogen generation systems, improved fatigue characteristics and a longer service life can be ensured for the steel as an effect of this improvement in aged ductility.

BEST MODE OF CARRYING OUT THE INVENTION

To obtain heat-resistance to and high-temperature strength against the high-temperature high-pressure environment of the hydrogen generation steam reforming reaction and to ensure aged ductility and fatigue characteristics which are required for use in environments involving load fluctuations, the heat-resistant cast steel of the present invention is adjusted to have the composition to be described below. The contents of the components are expressed all in mass %.

C: 0.1-0.5%

C combines with Nb when molten steel solidifies on casting, crystallizing out NbC at the grain boundary. Further when the reaction tube is used at a high temperature, C forming a solid solution in the matrix of austenitic phase bonded to Cr, producing a fine particulate Cr carbide ($Cr_{23}C_6$) precipitate. The precipitation hardening effect results in an enhanced creep rupture strength. The steel needs to have a C content of at least 0.1% to exhibit a creep rupture strength capable of withstanding the service environment of up to 1000° C. when used for the reformer reaction tube to be incorporated into the large-sized apparatus of oil refinery plants. Although an increased content leads to an enhanced creep rupture strength, C contents in excess of 0.5% entail impaired ductility due to an increased accumulation of precipitate of secondary carbide ($Cr_{23}C_6$) during long-term use at a high temperature and the resulting impairment of fatigue characteristics. For this reason, the C content should be restricted to 0.5% or lower. The C content should preferably be restricted to the range of 0.1 to 0.3% for the material of the reaction tubes of on-site units which are subjected to repeated load fluctuations like fuel cell hydrogen generation systems and of which high fatigue characteristics are required.

Si: up to 2.5%

Si is an element to be added for deoxidizing molten steel and giving fluidity to molten steel. Presence of up to 2.5% of Si is sufficient to afford this effect. In excess of this content, the element entails lower aged ductility and impairs the weld ability required for piping the reformer for the construction of the hydrogen generation system. The content is preferably 0.3 to 1.0%.

Mn: up to 2.5%

Mn is an element for deoxidizing molten steel and fixing S (formation of MnS) in molten steel to give enhanced weld ability required for piping the reformer and to contribute to an improvement in ductility. This effect almost levels off when the content exceeds 2.5%, which should therefore be an upper limit. Preferably, the content is 0.4 to 1%.

Cr: 15-26%

Cr is needed for ensuring high-temperature strength and oxidation resistance. Presence of at least 15% of Cr is necessary to obtain a creep rupture strength capable of withstanding the service environment having a high temperature of up to 1000° C. and required for the reaction tube of large-sized hydrogen generation systems of oil refineries. The high-temperature strength and oxidation resistance improve with an increase in the Cr content, whereas contents in excess of 26% result in lower aged ductility and lower fatigue characteristics although higher oxidation resistance is available. The impairment of fatigue characteristics is a phenomenon resulting from an increased accumulation of chromium carbide ($Cr_{23}C_6$) precipitating during a long period of use. Accordingly, the upper limit for the Cr content is 26%. The Cr content should preferably be limited to the range of 15 to 20% for use in an environment wherein load fluctuations require higher fatigue characteristics as is the case with the reformer reaction tube of on-site hydrogen generation systems for fuel cells. On the other hand, a higher Cr range of 20 to 26% is advantageous for use in a continuous high-temperature operation as is the case with large-sized hydrogen generation systems of oil refineries.

Ni: 8-23%

Ni is an element necessary for giving oxidation resistance and ensuring the stability of metal structures. If the content is less than 8%, it is difficult to obtain the high-temperature creep rupture strength required of the reformer reaction tube, while greatly impaired aged ductility will result. The Ni content should therefore be at least 8%. However, an increase in Ni content decreases the amount of solid solution of C in the matrix, and the decrease increases the amount of precipitate of the secondary carbides (mainly $Cr_{23}C_6$) during the actual use of the reaction tube, consequently entailing lower aged ductility and impaired fatigue characteristics. For this reason, the Ni content should not be in excess of 23%. The Ni content is limited preferably to the range of 8 to 18% for use in an environment wherein load fluctuations require higher fatigue characteristics as is the case with the reformer reaction tube to be incorporated into on-site hydrogen generation systems for fuel cells. On the other hand, a higher Ni range of 18 to 23% is advantageous for use in a continuous high-temperature operation as is the case with large-sized hydrogen generation systems of oil refineries.

Nb: 0.1-1.2%

Nb is bonded to C to form NbC, giving an enhanced creep rupture strength and contributing to an improvement in aged ductility. This effect is available when at least 0.1% of Nb is present. However, an excessive increase in the content leads to lower oxidation resistance, so that the upper limit should be 1.2%.

Ti: 0.01-1.0%

Ti has strong deoxidizing activity, while when in the form of a solid solution in the matrix, Ti bonded to C, producing a fine particulate (Nb,Ti)C double carbide precipitate and affording an enhanced creep rupture strength. At least 0.01% of Ti should be present to obtain this effect. An excess of Ti nevertheless produces an increased amount of titanium oxide to impair the cleanness of the steel and result in impaired quality, hence an upper limit of 1.0%.

Ce: 0.001-0.15

Ce forms a solid solution in the matrix and is effective for giving improved high-temperature oxidation resistance. This effect requires presence of at least 0.001% of Ce, preferably at least 0.01% thereof. Although the effect enhances with an increase in this content, an excess of Ce produces a large amount of cerium oxide to result in impaired cleanness and a lower quality. The upper limit is therefore 0.15%.

N: up to 0.06%

N is an interstitial solid solution element and has an effect to stabilize the austenitic phase of the matrix and gives an enhanced high-temperature tensile strength. However, an excessive increase in N content impairs the aged ductility in the temperature range of about 800° C. The upper limit is 0.06% to suppress this impairment of ductility. The preferred range is 0.01 to 0.05%.

B: 0.001-0.05%

B precipitates on the grain boundary, affording improved grain boundary ductility, inhibits growth of particles (formation of coarse particles) of chromium carbide ($Cr_{23}C_6$) and contributes to an improvement in creep rupture strength. This effect is available when at least 0.001% of B is present. However, increases over 0.05% lead to increased weld cracking sensitivity, impairing the weld ability required for piping the reformer, so that this value is taken as the upper limit.

Zr: 0.01-0.5%

Zr produces MC type carbide precipitate, acting to give an enhanced creep rupture strength. Presence of at least 0.01% of Zr produces this effect. Although increased contents are more effective, great contents in excess of 0.5%, produce an increased amount of zirconium oxide to entail impaired cleanness and the resulting impairment of ductility, so that this value is taken as the upper limit.

La: 0.001-0.15%

La produces a solid solution in the matrix to result in improved high-temperature oxidation resistance. Presence of at least 0.001% of La affords this effect. Although this effect increases with an increase in the amount of La, presence of an excess of this element produces a large amount of lanthanum oxide, leading to lower cleanness and impaired ductility. The upper limit is therefore 0.15%, and the preferred content is 0.001 to 0.1%.

Al: 0.01-0.3%

Al is added as a defoliant and effective for affording increased high-temperature oxidation resistance. This effect is available when at least 0.01% of Al is present. However, large contents in excess of 0.3% produce an increased amount of aluminum oxide, impairing the cleanness of the steel and entailing lower ductility. This value is therefore taken as the upper limit.

The chemical composition of the heat-resistant cast steel of the present invention comprises the elements defined as above and needs to be adjusted in the balance of components so as to have a parameter value P of 20 to 45, the parameter value P being represented by the following expression:

$$P=89.3-78.4C+0.1Si-5.7Mn-1.7Cr+0.01Ni+2Nb+5.3Ti-36.5N-50.8Ce$$

This expression was experimentally determined by conducting an aged ductility test [aging treatment at 800° C. for 3000 hours, followed by the measurement of fracture elongation]. The parameter value (=20 to 45) was a value obtained as the requirement for ensuring high ductility in terms of an aged fracture elongation of at least 20% while enabling the steel to retain a high-temperature creep rupture strength. While the problem of fatigue failure is encountered with the load fluctuating reformer reaction tube for use in on-site hydrogen generation systems, improved fatigue characteristics are ensured for the reaction tube as the effect of a remarkable improvement in aged ductility resulting from the adjustment of the balance of components.

The reformer reaction tube to be made from the heat-resistant cast steel of the invention is produced as a cast tube by centrifugal casting. The cast tube is therefore remarkably advantageous economically unlike those produced by hot plastic working. The cast tube obtained is finished by machining and assembled by welding as a component tube material of the reformer.

EXAMPLE

Specimen tubes were cast by preparing molten cast steels each having a specified composition in a high-frequency induction melting furnace having an Ar gas atmosphere and casting the steels by centrifugal casting with a mold. The tubes (as machined) measured 137 mm in outside diameter, 20 mm in wall thickness and 260 mm in length. Test pieces cut off from the specimen materials were subjected to a tensile test, creep rupture test and fatigue life test and observed under a microscope. Test pieces were tested as cast for creep rupture strength, while the other tests were conducted after subjecting test pieces to an aging treatment in an electric furnace.

The compositions of the specimen materials are shown in Table 1, and the test results in Table 2.

<I> Aged Tensile Ductility

Strips of test materials were aged (at 800° C. for 3000 hours), and test pieces were thereafter prepared from the strips for a tensile test and tested for fracture elongation by a tensile test according to JIS-Z2241.

Shape of test pieces: 8.75 mm-4 D in parallel portion diameter

Test temperature: room temperature

The symbols in Table 2, "aged rupture ductility" column represent the following.

○: at least 20% in fracture elongation

X: less than 20% in fracture elongation

<II> Creep Characteristics

Test pieces were prepared from the test materials and tested for rupture life (hours) by a tensile creep rupture test according to JIS-Z2272.

Shape of test pieces: 6 mm in parallel portion diameter, 30 mm in gauge length

Test temperature: 800° C.

Tensile stress: 80 MPa

<III> Fatigue Characteristics

The test materials were aged (at 800° C. for 1000 hours) to prepare test pieces, which were subjected to the following fatigue test according to JIS-Z2273 to determine the number of repetitions to failure, Nf (the number of repetitions until the stress range reached 75% of maximum stress), to evaluate fatigue life in terms of the value. The symbols in Table 2, "Fatigue characteristics" column represent the following.

○: at least 1000 in number of repetitions

X: less than 1000 in number of repetitions

Shape of test pieces: solid round bar (10 mm in diameter)

Test temperature: 800° C.

Total strain range ($\epsilon t$): ±0.3%

Strain rate: $10^{-1}$%/sec (C-C type reverted triangular wave)

Gauge length (G.L.): 15 mm

<IV> Observation of Metal Structure

The test pieces as aged (at 800° C. for 3000 hours) were polished, electrolytic ally corroded (corrosive solution: 10N aqueous potassium hydroxide solution) and thereafter checked for sigma phase precipitate under a microscope.

In Tables 1 and 2, Comparative Example (No. 21-No. 26), No. 21 is a material corresponding to SCH13 (JIS-G5122), No. 22 is a material corresponding to SCH22 (JIS-G5122), No. 23 is SCH13+Nb, No. 24 is SCH22+Nb,Ti, No. 25 is a high-N material, and No. 26 is a low-C Ti austenitic steel.

The materials of Example of the invention (No. 1-No. 12) remain free from sigma phase precipitates despite aging at a high temperature for a prolonged period of time, excellent in the stability of the structure, high in aged ductility and creep rupture life, and satisfactory in fatigue characteristics. Thus, the materials have characteristics desirable for hydrogen producing reformer reaction tubes, especially for reformer reaction tubes of load operation type apparatus which are subjected to repeated heat cycles.

On the other hand, Comparative Example (No. 21-No. 26) shows that No. 21 (SCH13) and No. 22 (SCH22) are low in aged fracture elongation, short in creep rupture life and also short in aged fatigue life.

Although No. 23 is slightly improved in creep rupture life as an effect of the addition of Nb to the base of SCH13, the material is low in aged fracture elongation and fatigue characteristics. No. 24 is remarkably improved in creep rupture life as an effect of the addition of both Nb and Ti to the base of SCH22, whereas the material has a sigma phase precipitate, is low in aged ductility and fatigue characteristics and is not suitable as a material for reformer reaction tubes of the load fluctuation type.

Although No. 25 has high matrix structure stability and no sigma phase precipitate as an effect of high N content, the material is low in aged ductility, creep rupture life and fatigue characteristics. No. 26 is satisfactory in aged fracture elongation and fatigue characteristics, but has a parameter value P in excess of the upper limit defined by the invention, is therefore low in creep rupture strength and is not suitable for use at a high temperature and high pressure as the material of steam reforming reaction tubes.

TABLE 1

| | Chemical Composition (mass %) balance Fe | | | | | | | | | | | | | | |
|---|---|---|---|---|---|---|---|---|---|---|---|---|---|---|---|
| No. | C | Si | Mn | P | S | Cr | Ni | Nb | Ti | Ce | N | Zr | B | La | Al |
| 1 | 0.39 | 0.45 | 0.63 | 0.014 | 0.009 | 20.0 | 14.8 | 0.52 | 0.12 | 0.05 | 0.027 | — | — | — | — |
| 2 | 0.30 | 0.35 | 0.57 | 0.015 | 0.009 | 16.0 | 10.3 | 0.30 | 0.10 | 0.03 | 0.030 | — | — | — | — |
| 3 | 0.24 | 0.34 | 0.51 | 0.016 | 0.008 | 19.0 | 14.7 | 0.32 | 0.13 | 0.05 | 0.025 | — | — | — | — |
| 4 | 0.13 | 0.32 | 0.45 | 0.014 | 0.007 | 18.6 | 14.5 | 0.28 | 0.15 | 0.06 | 0.022 | — | — | — | — |
| 5 | 0.45 | 0.43 | 0.55 | 0.015 | 0.010 | 15.3 | 11.6 | 0.43 | 0.09 | 0.02 | 0.028 | — | — | — | — |
| 6 | 0.21 | 0.54 | 0.47 | 0.016 | 0.007 | 18.9 | 22.4 | 1.18 | 0.07 | 0.07 | 0.059 | — | — | — | — |
| 7 | 0.20 | 0.41 | 0.53 | 0.015 | 0.007 | 22.3 | 16.7 | 0.60 | 0.15 | 0.07 | 0.023 | — | — | 0.03 | — |
| 8 | 0.18 | 1.84 | 2.04 | 0.015 | 0.009 | 15.3 | 21.8 | 0.27 | 0.16 | 0.05 | 0.027 | — | — | — | — |
| 9 | 0.23 | 0.60 | 0.71 | 0.014 | 0.008 | 18.6 | 14.3 | 0.40 | 0.38 | 0.10 | 0.013 | — | 0.009 | — | — |
| 10 | 0.22 | 0.37 | 0.51 | 0.016 | 0.007 | 19.7 | 14.7 | 0.37 | 0.11 | 0.01 | 0.045 | 0.12 | — | — | — |
| 11 | 0.23 | 0.33 | 0.49 | 0.017 | 0.007 | 19.9 | 15.0 | 0.36 | 0.08 | 0.06 | 0.030 | — | 0.011 | — | 0.12 |
| 12 | 0.30 | 0.56 | 0.70 | 0.016 | 0.009 | 24.9 | 16.5 | 0.61 | 0.78 | 0.02 | 0.015 | — | — | — | — |
| 21 | 0.41 | 1.07 | 1.18 | 0.017 | 0.008 | 24.7 | 12.5 | — | — | — | 0.047 | — | — | — | — |
| 22 | 0.42 | 0.98 | 1.21 | 0.015 | 0.007 | 24.8 | 19.7 | — | — | — | 0.061 | — | — | — | — |
| 23 | 0.36 | 1.03 | 1.09 | 0.017 | 0.006 | 25.6 | 12.4 | 1.36 | — | — | 0.055 | — | — | — | — |
| 24 | 0.40 | 0.99 | 1.05 | 0.015 | 0.009 | 25.1 | 21.2 | 0.48 | 0.09 | — | 0.033 | — | — | — | — |
| 25 | 0.34 | 0.44 | 0.65 | 0.014 | 0.009 | 21.3 | 14.1 | 0.39 | — | — | 0.166 | — | — | — | — |
| 26 | 0.04 | 0.38 | 0.52 | 0.015 | 0.010 | 19.7 | 13.0 | — | 0.21 | — | 0.027 | — | — | — | — |

TABLE 2

| No. | Parameter value of Expression [1] | Sigma phase precipitate*[1] | Rupture ductility*[2] | Creep life (Hrs)*[3] | Fatigue characteristics*[4] |
|---|---|---|---|---|---|
| 1 | 20 | ○ | ○ | 3854 | ○ |
| 2 | 34 | ○ | ○ | 2497 | ○ |
| 3 | 33 | ○ | ○ | 1680 | ○ |
| 4 | 43 | ○ | ○ | 1055 | ○ |
| 5 | 24 | ○ | ○ | 4337 | ○ |
| 6 | 35 | ○ | ○ | 1640 | ○ |
| 7 | 31 | ○ | ○ | 1708 | ○ |
| 8 | 36 | ○ | ○ | 1673 | ○ |
| 9 | 33 | ○ | ○ | 1561 | ○ |
| 10 | 35 | ○ | ○ | 1379 | ○ |
| 11 | 32 | ○ | ○ | 1472 | ○ |
| 12 | 25 | ○ | ○ | 3557 | ○ |
| 21 | 7 | ○ | X | 275 | X |
| 22 | 5 | ○ | X | 323 | X |
| 23 | 12 | X | X | 1015 | X |
| 24 | 10 | X | X | 3017 | X |
| 25 | 18 | ○ | X | 534 | X |
| 26 | 50 | ○ | ○ | 4 | ○ |

*[1]Aging: 800° C. × 3000 Hr    ○: no sigma phase precipitate    X: sigma phase precipitate
*[2]Aging: 800° C. × 3000 Hr    ○: fracture elongation ≧ 20%    X: fracture elongation <20%
*[3]Creep test: temp. 800° C., load 80 MPa
*[4]Aging: 800° C. × 1000 Hr    ○: fatigue life ≧ $10^3$    X: fatigue life <$10^3$

INDUSTRIAL APPLICABILITY

The heat-resistant cast steel of the present invention has high ductility and creep rupture life even after a long period of aging at a high temperature and is improved in fatigue characteristics. Accordingly, the steel is suitable as a material for steam reformer reaction tubes for use in fuel cell hydrogen generation systems and also in large-scale hydrogen generation systems to be operated at a high temperature and increased pressure in oil refineries. Because of especially high fatigue characteristics, the steel is suitable as a material for the reaction tubes of fuel cell hydrogen generation systems of the load fluctuation type to be subjected to repeated heat cycles due to fluctuations in the operating load between the daytime and nighttime, like on-site hydrogen generation systems (hydrogen stations). The steel ameliorates or overcome the problem of cracking due to repeated heat cycles, realizing a long-term stabilized operation.

The heat-resistant steel of the invention is diminished in the content of expensive Ni and advantageous also in cost. The reaction tube is manufactured by centrifugal casting and is economically more advantageous than those made by plastic working. The heat-resistant steel of the invention is usable also for heat-treatment hearth rolls for iron and steel making.

The invention claimed is:

1. A hydrogen producing reaction tube excellent in aged ductility and creep rupture strength, said tube being formed of a cast steel comprising, in mass %, 0.13 to 0.5% of C, up to 2.5% of Si, up to 2.5% of Mn, 15 to 26% of Cr, 8 to 23% of Ni, 0.1 to 1.2% of Nb, 0.01 to 1.0% of Ti, 0.001 to 0.15% of Ce, up to 0.06% of N and the balance substantially Fe, the cast steel being 20 to 45 in the parameter value P represented by the following expression:

$$P=89.3-78.4C+0.1Si-5.7Mn-1.7Cr+0.01Ni+2Nb+5.3Ti-36.5N-50.8Ce.$$

2. The hydrogen producing reaction tube according to claim 1, wherein said cast steel further contains one or at least two elements selected from the group consisting of 0.001 to 0.05% of B, 0.01 to 0.5% of Zr and 0.001 to 0.15% of La.

3. The hydrogen producing reaction tube according to claim 2, wherein said cast steel further contains 0.01 to 0.3% of Al.

4. The hydrogen producing reaction tube according to claim 3, wherein said cast steel contains 0.13 to 0.3% of C.

5. The hydrogen producing reaction tube according to claim 4, wherein said cast steel contains 15 to 20% of Cr and 8 to 18% of Ni.

6. The hydrogen producing reaction tube according to claim 3, wherein said cast steel contains 15 to 20% of Cr and 8 to 18% of Ni.

7. The hydrogen producing reaction tube according to claim 2, wherein said cast steel contains 0.13 to 0.3% of C.

8. The hydrogen producing reaction tube according to claim 7, wherein said cast steel contains 15 to 20% of Cr and 8 to 18% of Ni.

9. The hydrogen producing reaction tube according to claim 2, wherein said cast steel contains 15 to 20% of Cr and 8 to 18% of Ni.

10. The hydrogen producing reaction tube according to claim 1, wherein said cast steel further contains 0.01 to 0.3% of Al.

11. The hydrogen producing reaction tube according to claim 10, wherein said cast steel contains 0.13 to 0.3% of C.

12. The heat-resistant cast steel for hydrogen producing reaction tubes according to claim 11, wherein said cast steel contains 15 to 20% of Cr and 8 to 18% of Ni.

13. The hydrogen producing reaction tube according to claim 10, wherein said cast steel contains 15 to 20% of Cr and 8 to 18% of Ni.

14. The hydrogen producing reaction tube according to claim 1, wherein said cast steel contains 0.13 to 0.3% of C.

15. The hydrogen producing reaction tube according to claim 14, wherein said cast steel contains 15 to 20% of Cr and 8 to 18% of Ni.

16. The hydrogen producing reaction tube according to claim 1, wherein said cast steel contains 15 to 20% of Cr and 8 to 18% of Ni.

* * * * *